United States Patent
Barnett et al.

[15] 3,665,203
[45] May 23, 1972

[54] PARALLEL DIRECT CURRENT GENERATORS ARRANGEMENT

[72] Inventors: Elben Ray Barnett; Raymond Ray Barnett, both of Charleston, W. Va.

[73] Assignees: Jerry D. Hogg, Charleston; Secondo Dalporto, Charleston Hts., W. Va.; Tony Gentile, Wintersville, Ohio, part interest to each

[22] Filed: Mar. 15, 1971

[21] Appl. No.: 124,198

[52] U.S. Cl. .................................................307/84, 307/57
[51] Int. Cl. ..........................................................H02j 1/10
[58] Field of Search.................307/57, 51, 153, 84; 290/4 A; 317/6

[56] References Cited

UNITED STATES PATENTS

| | | |
|---|---|---|
| 2,894,149 | 7/1959 | Dortort.................................307/57 |
| 3,022,427 | 2/1962 | Jensen...................................307/57 |
| 3,465,163 | 9/1969 | White....................................307/57 |
| 3,543,126 | 11/1970 | Nolan et al..........................307/84 X |

Primary Examiner—Robert K. Schaefer
Assistant Examiner—William J. Smith
Attorney—William D. Hall, Elliott I. Pollock, Fred C. Philpitt, George Vande Sande, Charles F. Steininger and Robert P. Priddy

[57] ABSTRACT

A circuit arrangement for arranging a number of direct current generators, including generators having different characteristics in parallel. One generator is used as a master to excite the shunt fields of all of the generators and rectifiers are arranged in the output terminals of the parallel generator arrangement for preventing current from the armature of each generator from passing through the armature of any other generator.

7 Claims, 1 Drawing Figure

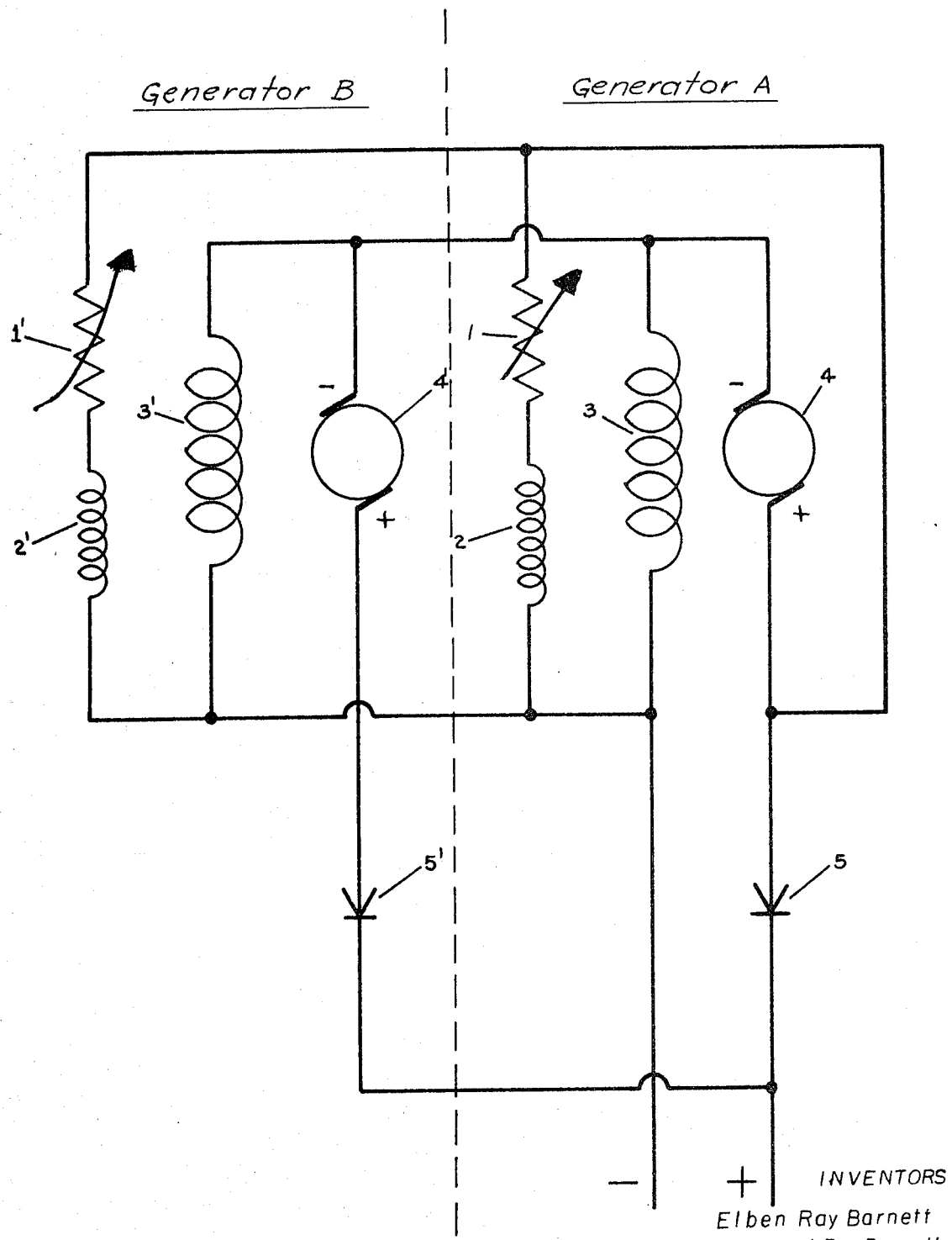

PARALLEL DIRECT CURRENT GENERATORS ARRANGEMENT

BACKGROUND OF THE INVENTION

Field of Invention

Power plants will sometimes be found to have several small generators rather than large single units capable of taking care of the maximum peak loads. The several units can then be operated singly or in various parallel combinations on the basis of the actual load demand, resulting in efficiency, continuity of service, and additions to the plant capacity as the power plant load increases. However, parallel combinations are not practical if the generators are subject to speed fluctuations.

Continuity of service is obviously impossible if a power plant constitutes a single unit because a breakdown of the prime mover or the generator would require complete shutdown of the entire station. If, however, there are several generators in parallel and one breaks down, it can be repaired with care, not in a rush, provided that other machines are available to maintain service.

The present invention renders the paralleling of DC compound wound generators more practical because it is not necessary to use only generators which must run at a constant speed, and thus enables one to better achieve the advantages of parallel generators arrangement as described above.

In coal mines it has been necessary to run several DC motors located at the face of the mine from separate DC diesel generators located near the mouth of the mine. Separate busses to each motor from its complementary generator have been necessary because the diesel DC generators are subject to abrupt changes in speed which heretofore prevented a parallel connection, because when the speeds of the generators connected in parallel changed in relation to each other the faster one would tend to motorize the slower one. It would be desirable to connect all of the generators in parallel and feed their output by a pair of wires to all of the motors in parallel, but it has not been practicable to do this in the past, especially where the several generators have different output capacities and are subject to speed fluctuations. The present invention makes such an arrangement practical; indeed, a large, and a small, DC compound wound generator, even varying speed generators, can be connected in parallel and each operate at its own full capacity in jointly feeding a single load. If one of the generators would suddenly stop running it would not adversely affect the operation of the other generators in this arrangement. Each generator would continue to share the total load in proportion to its capacity to the total capacity.

Description of the Prior Art

When two compound wound generators are operated in parallel, it has been customary to use an equalizer connection between the two armatures to insure that the current does not reverse its direction in one of the series fields. If the equalizer connection, which is a very low resistance conductor, is not used, the two machines may not operate satisfactorily in parallel. This equalizer connection, however, is only effective for very small changes of outputs and therefore is impractical to use with DC diesel generators, which are subject to large changes in output. When an output change occurs which is too large to be accommodated by the standard equalizer connection instability will result because any tendency on the part of one generator to assume more than its proper share of the total load will cause it to take on still more load. In the meantime the second generator continues to drop its load until it is running without load. It is, in fact, even possible for one of the machines to carry the entire load and, in addition, drive the other generator as a motor.

Summary of the Invention

The general purpose of this invention is to provide a circuit for arranging a plurality of direct current compound wound generators of various characteristics in parallel in such a manner that abrupt changes of speed by any one of them will not adversely affect the operation of the rest of the generators. To attain this, one generator, in which the rheostat is adjusted to arrive at the desired voltage, is used as a master generator to excite the shunt fields of all of the generators; and rectifiers are arranged between a terminal of each armature and an output bus to prevent the polarity of the output voltage from reversing. For the best efficiency the rheostats in each of the other generators is set so that each generator shares the load in the same proportion that its capacity bears to the total capacity of all the generators. In this manner any number of direct current compound wound generators may be utilized. Furthermore, all sizes of compound wound generators may be paralleled more efficiently in practically any given situation by using this particular circuit. Thus the number and size of the generators that are to be arranged in parallel is not a limiting factor. Any fluctuations in speed by any of the generators will not adversely affect the operation of the other generators. The generator whose speed changes temporarily will simply adjust itself back to its proper speed. If a generator should cease to function completely the other generators will share the load in the same proportion its capacity bears to the new total capacity of the generators.

BRIEF DESCRIPTION OF THE DRAWINGS

The FIGURE is a preferred embodiment of the present invention.

DESCRIPTION OF THE PREFERRED EMBODIMENT

Referring now to the figure, there is shown generator A having an armature 4 and generator B having an armature 4'. Generator A has a shunt field 2 in series with the current limiting variable resistor 1 and the series fields 3 and 3'. These two series fields are in parallel with each other. Similarly, generator B has a shunt field 2' in series with a current limiting variable resistor 1', and the series fields 3 and 3'. The positive terminals of armatures 4 and 4' are connected to rectifiers 5 and 5' respectively, as shown, so that the armatures thereby are all connected to the positive DC output bus.

As shown in the diagram, the positive terminal of armature 4 is connected through current limiting resistors 1 and 1' to shunt fields 2 and 2' respectively. Thus generator A acts as a master generator supplying voltage to the shunt fields of both generators.

The series field of each generator is preferably arranged, and so connected, that its flux is additive (in the same direction) as the shunt field of that generator, although it is within the scope of the broadest aspects of the invention for the series and shunt fields of each generator to oppose each other. It is also preferable for the two generators to have identical armatures, shunt fields and series fields, although this also is not required. For the most efficient operation the rheostats in each of the generators is set so that the voltage running through all of them is the same.

In the operation of the invention current from generator 4 is fed to the positive DC bus through rectifier 5 and at the same time fed via resistors 1 and 1' to shunt fields 2 and 2' respectively. The return path of the current through shunt fields 2 and 2' is through series fields 3 and 3' and back to the negative terminals of the armatures 4 and 4' respectively. The current from the negative bus passes through series fields 3 and 3' respectively and returns to the negative terminal of armatures 4 and 4' respectively.

In this manner the generator A is used as a master generator to excite all of the shunt fields in the parallel generator arrangement to provide more efficient operation of the system.

Since the series fields 3 and 3' are in parallel, reversal of current in one of them and also the possibility of one generator running the other as a motor, is avoided.

Obviously many modifications and variations of the present invention are possible in the light of the above teachings. It is

We claim:

1. A circuit for operating in tandem a plurality of DC generators each of which has an armature, a series field and a shunt field, and wherein the series fields of all generators are in parallel with each other, comprising:
   means for energizing all of the shunt fields from the outputs of less than all of the generators, and
   rectifier means, including an individual rectifier in the output of each generator, for combining the outputs from the generators without allowing current from one armature to enter any other armature.

2. The device as described in claim 1 wherein only one of said plurality of DC generators supplies current to the shunt fields of all said plurality of DC generators.

3. In combination,
   a plurality of DC generators each having an armature, a series field and a shunt field,
   means for connecting all of the series fields of said generators in parallel,
   means for energizing all of the shunt fields from less than all of the generators, and
   output means, including an individual rectifier in the output of each generator, for combining the outputs of all the generators without allowing current from any one of the armatures from passing through any other armature.

4. The combination of claim 3 in which all of the shunt fields are energized by a single one of the generators.

5. In a system for combining the outputs of two DC generators,
   first and second generators each having an armature, a shunt field and a series field, each armature having a first terminal of a first polarity and a second terminal of a second polarity,
   an output comprising a first bus of one polarity and a second bus of a second polarity,
   a rectifier connecting the first terminal of one armature to the first bus and a rectifier connecting the first terminal of the other armature to the first bus, said rectifiers allowing current to pass from the armatures to the first bus but blocking current flow from the bus to the armatures,
   a conductor connecting one side of each series field to the second terminal of each armature,
   another conductor connecting the other side of each series field to the second bus and to one side of each shunt field,
   and a conductor means connecting the other sides of the shunt fields to the first terminal of one only of said armatures,
   each series field being connected so that the field set up thereby is additive to that of its complementary shunt field.

6. In the combination of claim 3:
   separate power sources for driving the generators respectively, at least one of said power sources being subject to variable driving speeds.

7. In a system as defined in claim 5, separate power sources for driving the first and second generators respectively, said power sources being subject to varying driving speeds.

* * * * *